US012643211B2

(12) United States Patent
Simonin

(10) Patent No.: US 12,643,211 B2
(45) Date of Patent: Jun. 2, 2026

(54) EXTENSION POLE FOR DRIVING TOOL

(71) Applicant: Illinois Tool Works Inc., Glenview, IL (US)

(72) Inventor: Jean-Luc Simonin, Barcelonne (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/950,791

(22) Filed: Nov. 18, 2024

(65) Prior Publication Data

US 2025/0162119 A1 May 22, 2025

(30) Foreign Application Priority Data

Jul. 19, 2024 (EP) .................................... 24315349

(51) Int. Cl.
*B25C 7/00* (2006.01)
*B25F 5/02* (2006.01)

(52) U.S. Cl.
CPC . *B25C 7/00* (2013.01); *B25F 5/02* (2013.01)

(58) Field of Classification Search
CPC .................................... B25C 7/00; B25F 5/02
See application file for complete search history.

(56) References Cited

U.S. PATENT DOCUMENTS 3,985,188 A * 10/1976 Steele ..................... B25G 1/04 30/296.1
4,147,220 A * 4/1979 Swiderski, Jr. ......... B23B 45/02 42/106
4,153,193 A 5/1979 Urbanowicz
4,284,223 A * 8/1981 Salcido ..................... B25C 7/00 227/5
4,479,599 A * 10/1984 Conrad ................... B25C 1/008 227/156
4,736,804 A * 4/1988 Geibel ................. B25H 1/0035 408/136
5,295,620 A * 3/1994 Cousineau ........... B25H 1/0035 408/136
5,598,892 A * 2/1997 Fox ......................... B25F 5/026 30/296.1
5,820,317 A * 10/1998 Van Troba ........... B25H 1/0035 73/36
6,095,724 A * 8/2000 Hurt ..................... B25H 1/0035 408/136
7,228,917 B2 6/2007 Davis et al.
7,237,707 B1 * 7/2007 Wakelin .................... B25C 7/00 173/171
7,258,261 B1 * 8/2007 Reyes ....................... B25C 7/00 227/156
7,617,885 B2 * 11/2009 Howland .................. B25F 5/00 173/171

(Continued)

OTHER PUBLICATIONS

Extended European Search Report from European Application No. 24315349.1, dated Jan. 16, 2025 (9 pages).

*Primary Examiner* — Lucas E. A. Palmer
(74) *Attorney, Agent, or Firm* — Neal, Gerber & Eisenberg LLP

(57) ABSTRACT

An extension pole for a driving tool, the extension pole including a mounting mechanism for mounting the driving tool to the extension pole and an actuating mechanism configured such that a release force applied towards the driving tool mounted to the extension pole causes a trigger of the driving tool to move in an opposite direction to actuate the trigger.

19 Claims, 10 Drawing Sheets

(56) References Cited

U.S. PATENT DOCUMENTS

| | | | | |
|---|---|---|---|---|
| 7,789,353 | B2 * | 9/2010 | Koerlin | B25H 1/0035 408/136 |
| 7,896,210 | B2 | 3/2011 | Popovich et al. | |
| 8,905,687 | B2 * | 12/2014 | Blatz | B25F 5/021 408/136 |
| 9,174,337 | B2 * | 11/2015 | Buchner | B25H 1/0035 |
| 9,440,343 | B2 | 9/2016 | Herelier et al. | |
| 10,646,931 | B2 * | 5/2020 | Moore | B25D 17/28 |
| 10,926,399 | B2 * | 2/2021 | Mikec | B25H 1/0035 |
| 11,260,519 | B2 * | 3/2022 | Frenken | B25F 5/021 |
| 2005/0000713 | A1 * | 1/2005 | Pourtler | B25C 7/00 173/29 |
| 2005/0276670 | A1 * | 12/2005 | Freund | B25H 1/0035 408/129 |
| 2007/0045376 | A1 | 3/2007 | Gaudron et al. | |
| 2007/0074882 | A1 * | 4/2007 | Davis | B25C 7/00 173/18 |
| 2012/0126560 | A1 * | 5/2012 | Ockleston | B25F 5/021 294/209 |
| 2013/0206809 | A1 | 8/2013 | Popovich et al. | |
| 2016/0263738 | A1 * | 9/2016 | May | B25H 1/0057 |
| 2016/0303730 | A1 * | 10/2016 | Carvajal | B25B 23/0071 |
| 2017/0157727 | A1 * | 6/2017 | Felton | B23Q 11/0046 |
| 2018/0126541 | A1 * | 5/2018 | Jeremenko | B25H 1/0035 |
| 2024/0116165 | A1 | 4/2024 | Scott et al. | |

* cited by examiner

EXTENSION POLE FOR DRIVING TOOL

PRIORITY

This application claims priority to and the benefit of French Patent Application No. 2312896, filed Nov. 22, 2023, French Patent Application No. 2312897, filed Nov. 22, 2023, French Patent Application No. 2312898, filed Nov. 22, 2023, and European Patent Application No. 24315349.1, filed Jul. 19, 2024, the entire contents of each of which are incorporated herein by reference.

BACKGROUND

The present disclosure relates generally to driving tools and extension poles for such tools. More specifically, although not exclusively, the present disclosure relates to extension poles for driving tools that include actuating mechanisms.

Extension poles for driving tools are known for driving fixings into ceilings and other similar uses. The driving tool is usually mounted at one end of the extension pole and the other end incorporates a mechanism of remotely operating the driving tool. The mounting system normally supports both the handle and the main body of the driving tool.

SUMMARY

A non-exclusive object of the present disclosure is to provide an extension pole that is easier to use.

The present disclosure relates to an extension pole for a driving tool.

The extension pole can comprise a mounting mechanism, for example for mounting the driving tool to the extension pole.

The extension pole can comprise an actuating mechanism.

The actuation mechanism can be configured so that a release force, which can be applied towards the driving tool mounted on the extension pole, causes a trigger on the driving tool to move, for example in an opposite direction to actuate the trigger.

The present disclosure also relates to an extension pole for a driving tool, the extension pole comprising a mounting mechanism for mounting the driving tool to the extension pole and an actuating mechanism configured such that a release force applied towards the driving tool mounted to the extension pole causes a trigger of the driving tool to move in an opposite direction to actuate the trigger.

This arrangement enables the trigger of the driving tool to be actuated by a force pushing the driving tool against the substrate into which a fastener is to be driven.

The extension pole or actuation mechanism can comprise a trigger actuator.

The extension pole or actuation mechanism can comprise a release. The release can be connected to the trigger actuator, for example via the actuation mechanism.

The mounting mechanism can be located at one end of the pole. The mounting mechanism can comprise a housing.

In various example embodiments, the actuation mechanism can be configured such that a release force, which can be applied to the release, causes the trigger actuator to move, for example to actuate a trigger of the driving tool mounted on the housing or the mounting mechanism.

The release force can be applied to the release to move it towards the housing or the mounting mechanism. The movement of the trigger actuator can be in an opposite direction.

More specifically, the extension pole can comprise a trigger actuator and a release connected to the trigger actuator by the actuation mechanism, wherein the actuation mechanism is configured such that a release force applied to the release to move it towards the housing causes the trigger actuator to move in an opposite direction to actuate a trigger of the driving tool mounted on the housing.

The present disclosure also relates to an extension pole for a driving tool, the extension pole comprising a housing or a mounting mechanism for mounting the driving tool to the extension pole, a trigger actuator and a release connected to the trigger actuator by an actuation mechanism, wherein the actuation mechanism is configured such that a release force applied to the release to move it towards the housing or the mounting mechanism causes the trigger actuator to move in an opposite direction to actuate a trigger of the driving tool mounted on the housing or the mounting mechanism.

The actuation mechanism can comprise a lever. The lever can comprise a first end. The lever can comprise a second end.

The first end of the lever can be connected to the trigger actuator. The second end of the lever can be connected to the release.

The lever can be pivotably connected, for example between its first and second ends, to the extension pole.

More specifically, the actuating mechanism can comprise a lever with a first end connected to the trigger actuator and a second end connected to the release, the lever being pivotably connected between its first and second ends to the extension pole.

The release can comprise a tubular handle. The tubular handle can surround the extension pole, for example a part of the extension pole. The tubular handle can slide along the extension pole, for example a part of the extension pole, for example when the release force is applied thereto.

More specifically, the release can comprise a tubular handle surrounding the extension pole and slidable there along when the release force is applied thereto.

The extension pole can comprise a rod. The rod can be solid or tubular. The tubular handle can surround the rod of the extension pole. The tubular handle can slide along the rod of the extension pole, for example when the release force is applied thereto. The rod can provide a part of the extension pole that is grippable or gripped by a user.

The tubular handle can be biased towards a retracted position. The tubular handle can be movable from the retracted position, for example to an extended position, when the release force is applied thereto.

In various example embodiments, the tubular handle is biased towards a retracted position and is movable from the retracted position to an extended position when the release force is applied thereto.

The release can comprise a connection plate pivotably connected at a first end to the tubular handle. The connection plate can be pivotably connected at a second end to the second end of the lever.

In various example embodiments, the connection plate is L-shaped. The connection plate can be fixed to the tubular handle by two fasteners. The connection plate ca be pivotably connected to the second end of the lever.

In various example embodiments, the extension pole comprises at least one pin fixed to the housing. The trigger actuator can define a slot. The at least one pin can be received or receivable in the slot such that the slot is movable along the at least one pin.

In various example embodiments, the at least one pin is two pins. The two pins can be received or receivable in the slot such that the slot is movable, for example longitudinally, along the two pins.

The extension pole can comprise a safety stop. The safety stop can be configured to inhibit unintentional actuation of the trigger.

Specifically, the extension pole can comprise a safety stop configured to inhibit unintentional actuation of the trigger.

The release can comprise a tubular handle surrounding the extension pole, for example a part of the extension pole, and slidable there along when the release force (FD') is applied thereto. Unintentional actuation of the trigger can be inhibited by the safety stop passing through aligned apertures in the tubular handle and the extension pole.

The extension pole can comprise a safety mechanism. The safety mechanism can comprise the safety stop. the safety stop can be at an end of a lever handle. The lever handle can be pivotable against a force applied by a biasing member. The lever handle can be pivotable against a force applied by a biasing member to retract the safety stop from the aperture in the extension pole to allow the tubular handle to slide along the extension pole.

The lever handle can be pivotably mounted to a sleeve that is fixed to the tubular handle. The biasing member can be located between a handle part of the lever handle and the sleeve. A pivot, about which the lever handle is pivotable, can be located between the safety stop and the handle portion.

The housing or the mounting mechanism can comprise a surface, seat, or other feature against or in which the driving tool can be received and/or mounted. The housing or the mounting mechanism can comprise a surface, handle seat or other feature, for example to receive a handle of the driving tool. Additionally or alternatively, the housing or mounting mechanism can comprise a surface, magazine holder seat or other feature, for example to receive a magazine holder of the driving tool.

The housing or the mounting mechanism can comprise a securing mechanism, for example for securing one or each of the handle and the magazine holder in its respective seat. The securing mechanism can e configured to secure the handle without securing a main body of the driving tool.

In various example embodiments, the mounting mechanism comprises a housing with a handle seat for receiving a handle of the driving tool, a magazine holder seat for receiving a magazine holder of the driving tool and securing mechanism for securing one or each of the handle and the magazine holder in its respective seat.

The provision of a housing or the mounting mechanism with respective seats for the handle and magazine holder enables the extension pole to be used with different models of driving tools, regardless of the shape of its main body.

The securing mechanism can comprise a latch.

The latch can be operable to engage with the handle, for example under a trigger of the driving tool, to secure the handle in the handle seat.

The latch can be operable to engage the magazine holder, for example to secure the magazine holder in the magazine holder seat.

More specifically, the securing mechanism can comprise a latch operable to engage the handle under a trigger of the driving tool to secure the handle and magazine holder in their respective seats.

The latch can be operable to simultaneously engage the handle and the magazine holder, for example to simultaneously secure the handle in the handle seat and the magazine holder in the magazine holder seat.

The handle seat can be configured to receive the handle from a lateral side of the housing.

The housing or the mounting mechanism can be located at either end of the pole. The extension pole, housing or mounting mechanism can comprise one or more of the features described above.

The latch can be rotatable, for example between an unlocked position and a locked position.

In the unlocked position, the latch can be configured to pass between the handle and the magazine holder, for example on removal of the driving tool.

In the locked position, the latch can be configured to engage with the handle, for example to secure the handle in the handle seat.

More specifically, the latch can be rotatable between an unlocked position, in which the latch can pass between the handle and the magazine holder upon removal of the driving tool, and a locked position, in which the latch engages the handle to secure the handle in the handle seat.

In the locked position, the latch can be configured to simultaneously engage the handle and the magazine holder, for example to simultaneously secure the handle in the handle seat and the magazine holder in the magazine holder seat.

The latch can comprise a pair of wings. The wings can project radially, for example from a central hub.

The wings can be configured to engage the handle and the magazine holder, for example simultaneously, when the lock is in the locked position.

More specifically, the latch can comprise a pair of wings projecting radially from a central hub to engage the handle and magazine holder simultaneously when the latch is in the locked position.

In the locked position, the latch can be configured to engage the magazine holder, for example to secure the magazine holder in the magazine holder seat.

The extension pole can comprise a stopper. The stop can be to inhibit rotation of the latch out of its locked position and/or its unlocked position.

More specifically, the extension pole can include a stop to inhibit rotation of the latch out of its locked and unlocked positions.

The latch can be resiliently biased against the housing, for example such that rotation of the latch out of the locked and/or unlocked position causes the latch to move up to the stop.

More specifically, the latch can be resiliently pressed against the housing, so that rotation of the latch out of the locking or unlocking position causes the latch to move up the stop.

In other words, the latch can pass over/over the stop, moving the latch away from the housing, as it rotates from the locked position to the unlocked position and vice versa. The resilient pressure to which the latch is subjected can ensure that the latch returns to/against the housing, in its locked or unlocked position in which the stop inhibits rotation of the latch out of that position.

The magazine holder can be spaced from the handle. The latch can be accommodated between the handle and the magazine holder, for example when the driving tool is mounted on the housing.

In various example embodiment, the extension pole comprises a length adjustment pole. The length adjustment pole can be slidably received or receivable in the extension pole. The length adjustment pole can be slidably received or receivable in the extension pole at an end distal to the mounting mechanism. The length adjustment pole can be movable between an extended position and a retracted position.

The extension pole can comprise a first spring button located inside of the length adjustment pole. A button of the first spring button can pass through a first aperture in the length adjustment pole. A button of the first spring button can pass through a first aperture in the length adjustment pole at a location between a first end of the length adjustment pole and a centre of the length adjustment pole. The extension pole can comprise a second spring button located inside of the length adjustment pole. A button of the second spring button can pass through a second aperture in the length adjustment pole. A button of the first spring button can pass through a second aperture in the length adjustment pole at a location proximal a second end of the length adjustment pole. The extension pole can comprise a length adjustment hole. The extension pole can comprise a length adjustment hole located proximal an end distal to the housing. In an extended configuration, the button of the first spring button can be located in the length adjustment hole. In a retracted configuration, the button of the second spring button can be located in the length adjustment hole. In the retracted configuration the button of the first spring button can be located inside of the extension pole.

The present disclosure also relates to an assembly comprising a driving tool and an extension pole, for example as described above.

The driving tool can comprise a nailer or stapler.

For the avoidance of doubt, all features described herein apply equally to any aspect of the disclosure.

In the context of the present application, it is expressly intended that the various aspects, embodiments, examples, and alternatives set out in the preceding paragraphs, in the claims and/or in the following description and drawings, and in particular the individual features thereof, can be taken independently or in any combination. In other words, all embodiments and/or features of any embodiment can be combined in any manner, unless such features are incompatible.

For the avoidance of doubt, the terms “may”, “and/or”, “for example”, and any other similar terms used herein are to be construed as non-limiting, so that not every feature so described need be present. Indeed, any combination of optional features is expressly contemplated without departing from the scope of the disclosure, whether or not they are expressly claimed. The applicant reserves the right to amend any originally filed claim or to file any new claim accordingly, including the right to amend any originally filed claim to depend on and/or incorporate any feature of any other claim although not originally claimed in that manner.

BRIEF DESCRIPTION OF THE FIGURES

Further features and advantages of the present disclosure will become apparent from the following detailed description, for the understanding of which reference is made to the appended drawings.

DETAILED DESCRIPTION OF THE DISCLOSURE

Figure 1:
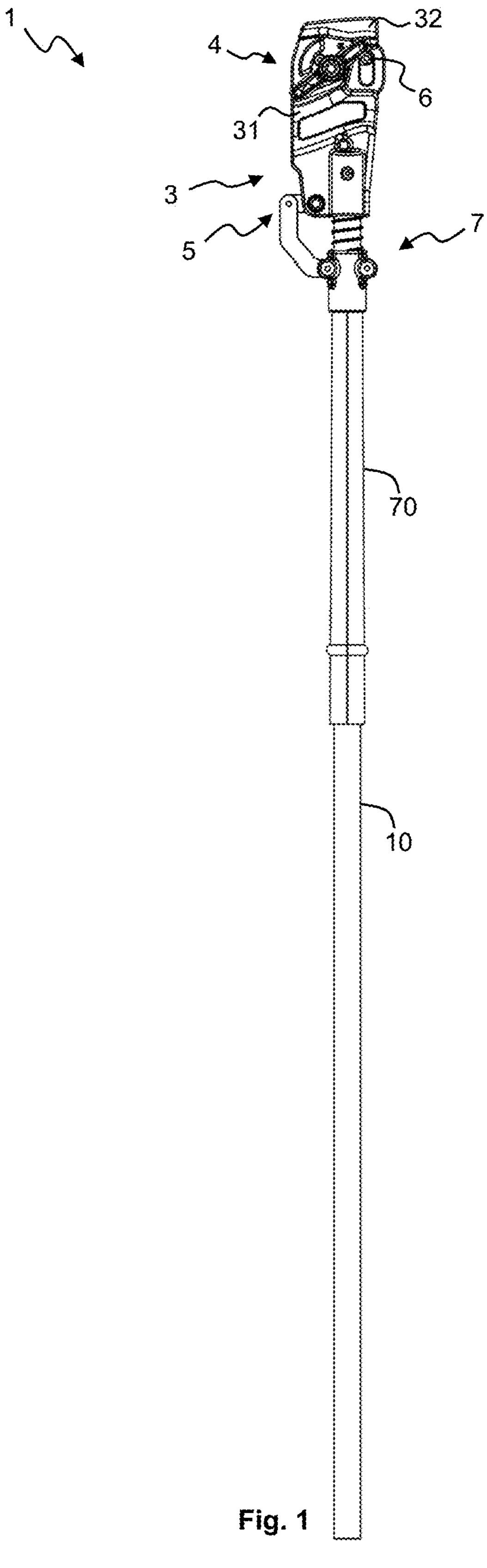
FIG. 1 illustrates an extension pole according to one example embodiment of the present disclosure.
Figure 2:
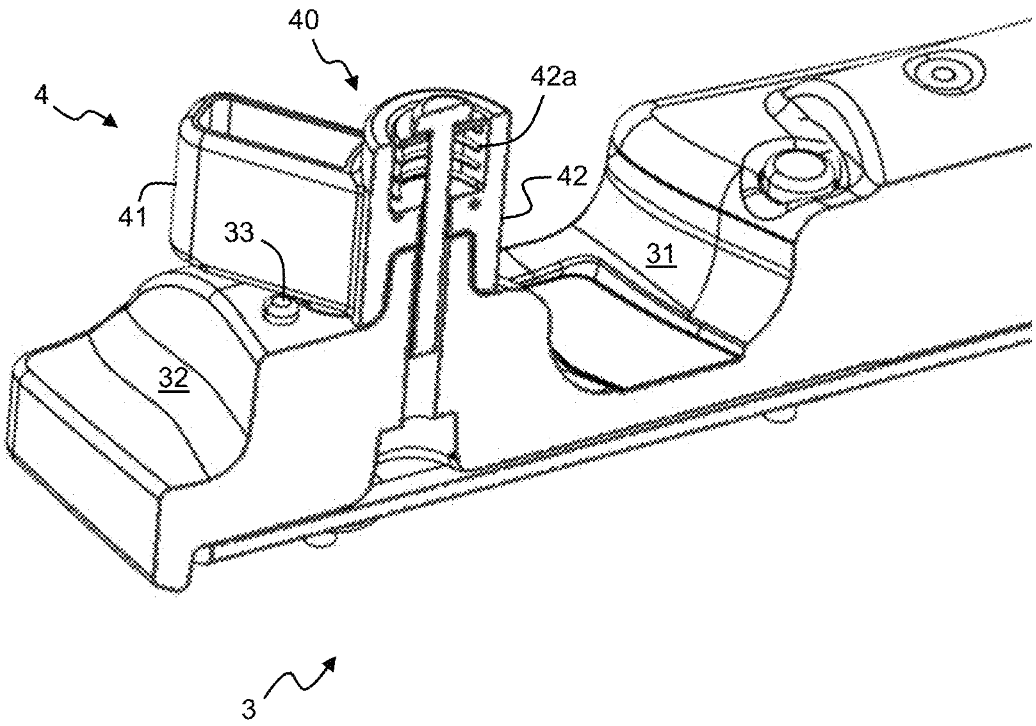
FIG. 2 shows a partial cross-section of the latch, illustrating the spring that pushes the latch towards the housing of the extension pole of FIG. 1.
Figure 3:
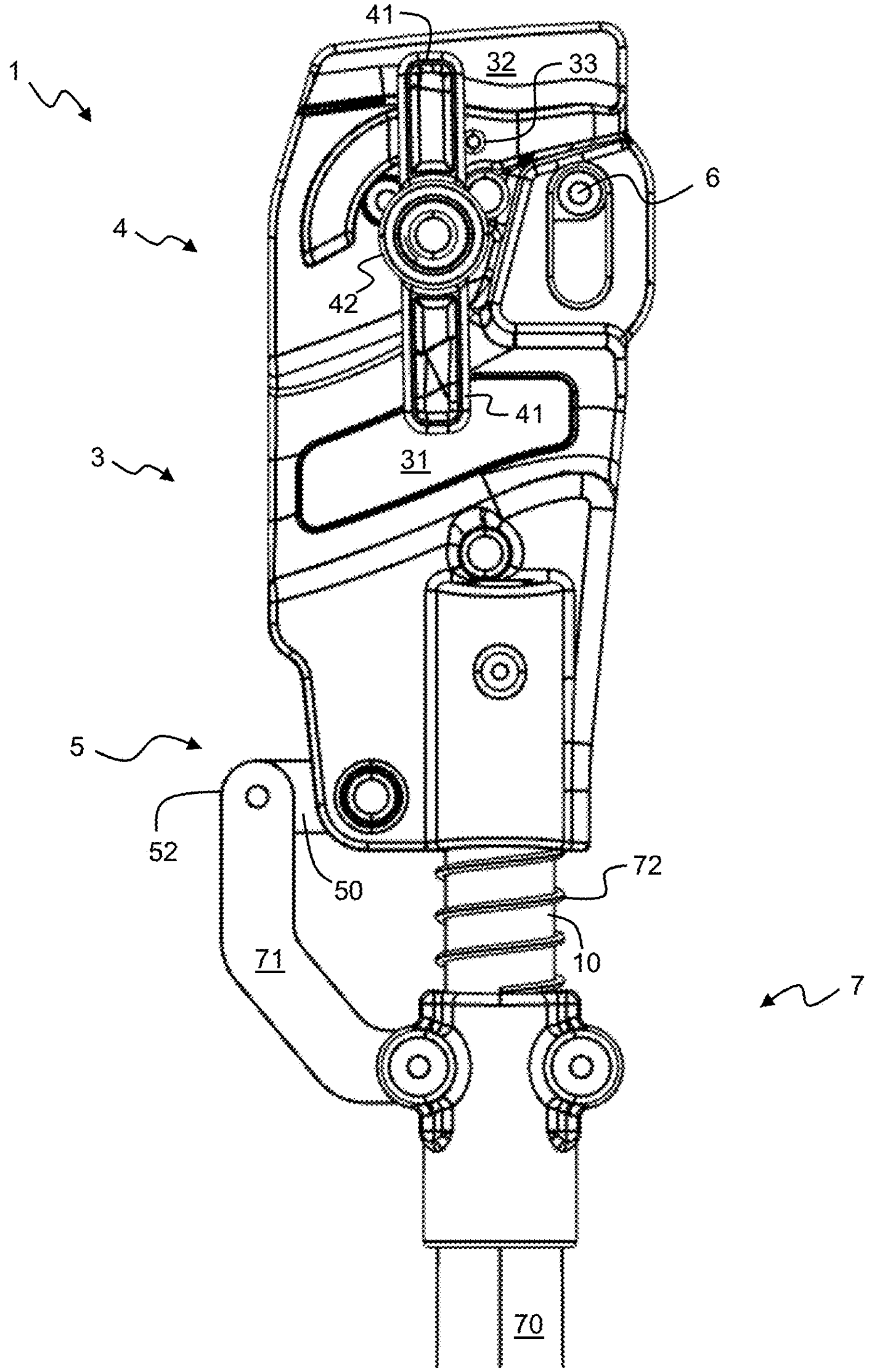
FIG. 3 shows an enlarged view of the extension pole housing of FIG. 1, with the latch in the locked position.

While the systems, devices, and methods described herein may be embodied in various forms, the drawings show, and the specification describes certain exemplary and non-limiting embodiments. Not all components shown in the drawings and described in the specification may be required, and certain implementations may include additional, different, or fewer components. Variations in the arrangement and type of the components, the shapes, sizes, and materials of the components, and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Referring now to FIGS. 1 to 6, there is shown an extension pole 1 for a driving tool 2 for driving fasteners in accordance with one example embodiment of the present disclosure. The extension pole 1 comprises a rod 10, a housing-like mounting mechanism 3 for mounting the driving tool 2 to the extension pole 1, a securing mechanism 4 and an actuating mechanism 5. The extension pole 1 also comprises a trigger actuator 6 and a release 7 connected to the trigger actuator 6 via the actuating mechanism 5.

The driving tool 2 comprises a handle 20, a magazine holder 21, a trigger 22, a main body 23 with a firing chamber (not shown) and a magazine 24 mounted on the magazine holder 21. The handle 20 and magazine holder 21 each depend from spaced locations on the main body 23.

The housing 3 comprises a handle seat 31 for receiving the handle 20 of the driving tool 2 and a magazine holder seat 32 for receiving the magazine holder 21 of the driving tool 2. The securing mechanism 4 comprises a latch 40 operable to engage the handle 20 and magazine holder 21 of the driving tool 2 to secure them in their respective seats 31 and 32.

The latch 40 comprises a pair of wings 41 projecting radially from a central hub 42 and is rotatable relative to the housing 3. More specifically, the latch 40 is rotatable between an unlocked position and a locked position, in which the latch 40 secures the handle 20 and magazine holder 21 in the housing 3.

When the latch 40 is in the unlocked position, the handle seat 31 and the magazine holder seat 32 are configured to receive the handle 20 and the magazine holder 21 of the driving tool 2 from a lateral side of the housing 3. The orientation of the latch 40 is such that it can pass between the handle 20 and the magazine holder 21 to allow removal of the driving tool 2.

In the locked position, the wings 41 engage in the handle 20 and the magazine holder 21 simultaneously to secure them in their respective seats 31 and 32. Specifically, one of the wings 41 engages the handle 20 under the trigger 22 of the driving tool 2 and the other wing 41 engages the magazine holder 21 at a corresponding location.

The housing 3 also includes a stop 33 to inhibit rotation of the latch 40 out of its locked and unlocked positions. A spring 42*a* is housed in the central hub 42, which pushes the latch 40 towards the housing 3. As a result, rotation of the latch 40 out of the locked or unlocked position causes the latch 40 to move up onto the stop 33.

In other words, the latch 40 passes over/over the top of the stop 33, moving the latch 40 away from the housing 3, as it rotates from the locked position to the unlocked position and vice versa. The spring ensures that the latch 40 returns to/against the housing 3 in its locked or unlocked position.

The actuating mechanism 5 comprises a lever 50. The lever 50 comprises a first end 51 pivotably connected to the trigger actuator 6. The lever 50 comprises a second end 52 pivotably connected to the release 7. The lever 50 is also connected to the housing 3 between its ends 51 and 52 by a further pivotable connection 50*a*.

The trigger actuator 6 is pivotably connected to the first end 51 of the lever 50 by an actuator plate 60. One end of the actuator plate 60 is pivotably connected to the lever 50 and the trigger actuator 6 is mounted thereon adjacent its opposite end. The actuator plate 60 comprises a slot 61 along its length, which receives a pair of pins 62 fixed to the housing 3 to ensure only longitudinal movement of the actuator plate 60.

The release 7 comprises a tubular handle 70 surrounding the rod 10 of the extension pole 1, an L-shaped connection plate 71, which is fixed to the tubular handle 70 by fasteners F and pivotably connected to the second end 52 of the lever 50. The release 7 also comprises a spring 72 surrounding the rod 10 and captivated between the tubular handle 70 and the housing 3 in order to move the tubular handle 70 away from the housing 3. The rod 10 can be a solid rod or can be tubular.

Figure 4:
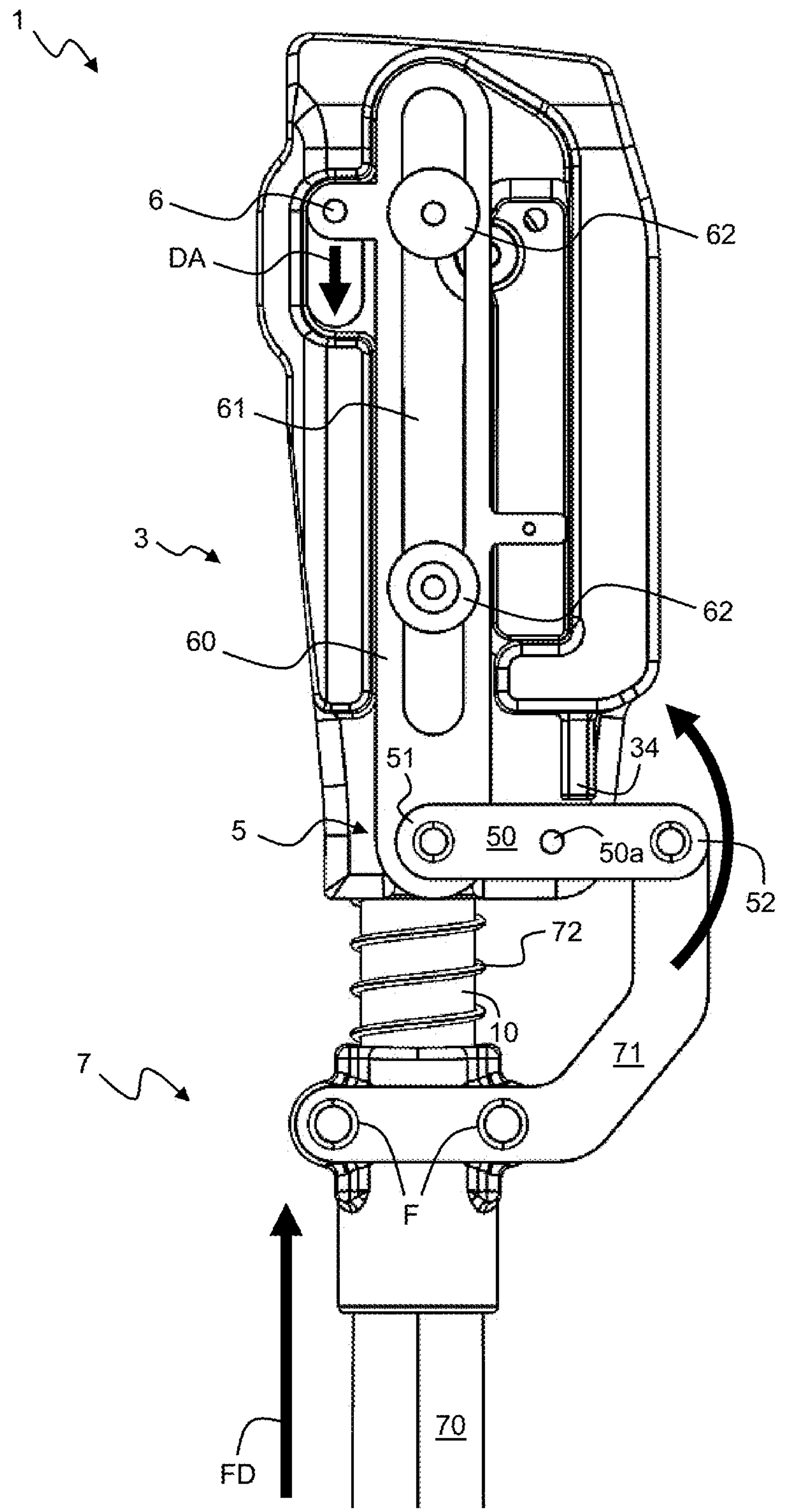
FIG. 4 shows a similar view to FIGS. 2 and 3 from the rear.
Figure 5:
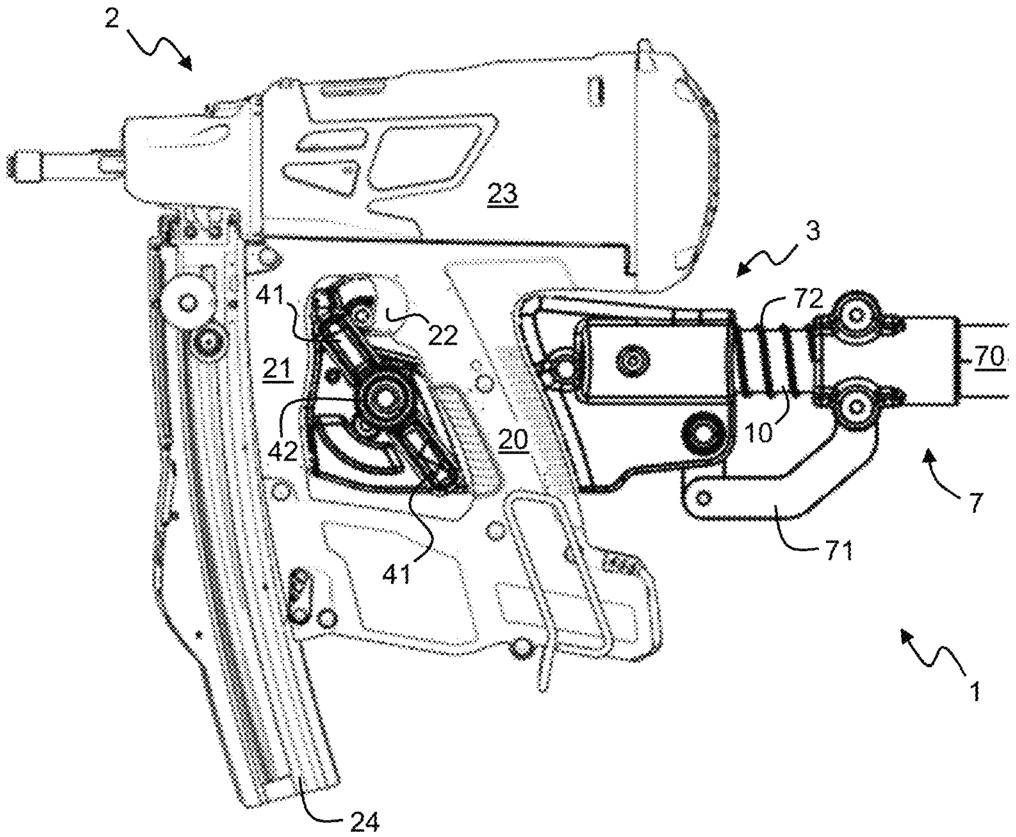
FIG. 5 shows a view similar to FIG. 2 with a driving tool loaded on the housing and the latch in the unlocked position.
Figure 6:
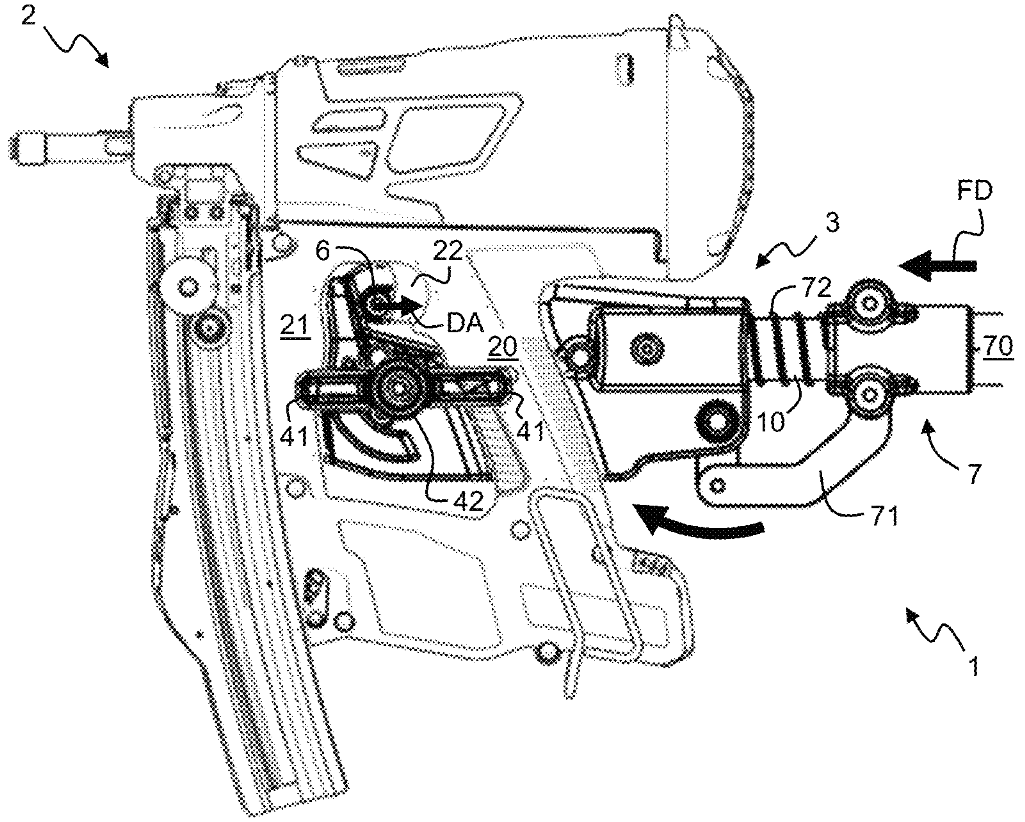
FIG. 6 shows a similar view to FIG. 5 with the latch in the locked position to secure the driving tool in place.

As shown more clearly in FIG. 4, a release force FD applied to the tubular handle 70 of the release 7 causes it to slide along the rod 10 towards the housing 3 from a retracted position to an extended position. As a result, the trigger actuator 6 moves in the opposite direction to actuate the trigger 22 of the driving tool 2.

The tubular handle 70 is biased towards the retracted position and returns to this position when it is released. Although the tubular handle 70 can move freely along the rod 10, a safety stop 34 on the housing 3 prevents the lever 50 from rotating. This prevents unintentional actuation of trigger 22.

Figure 7:
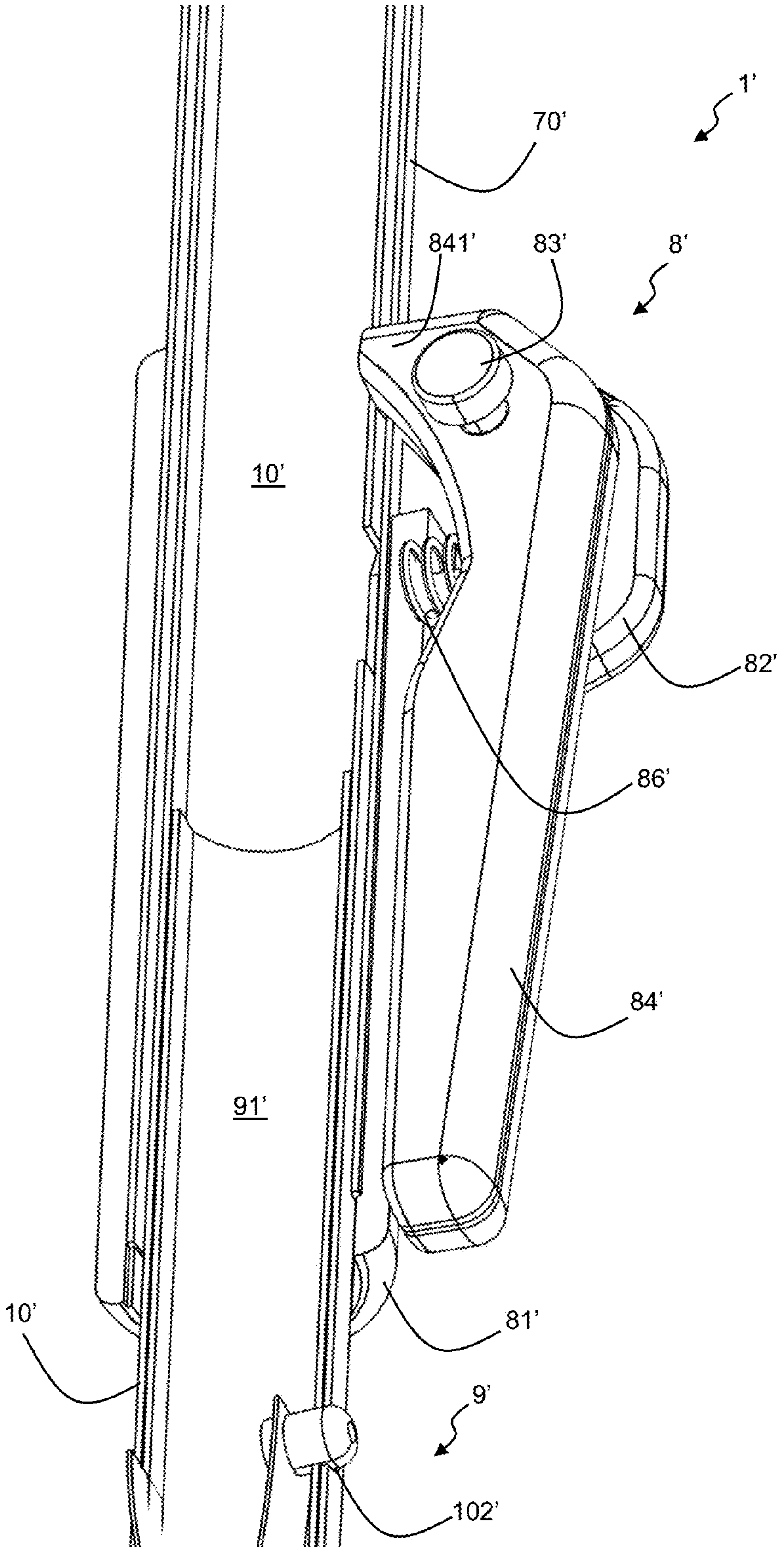
FIG. 7 illustrates a safety mechanism of an extension pole according to another example embodiment of the present disclosure, wherein the extension pole is shown in sectional view.
Figure 8:
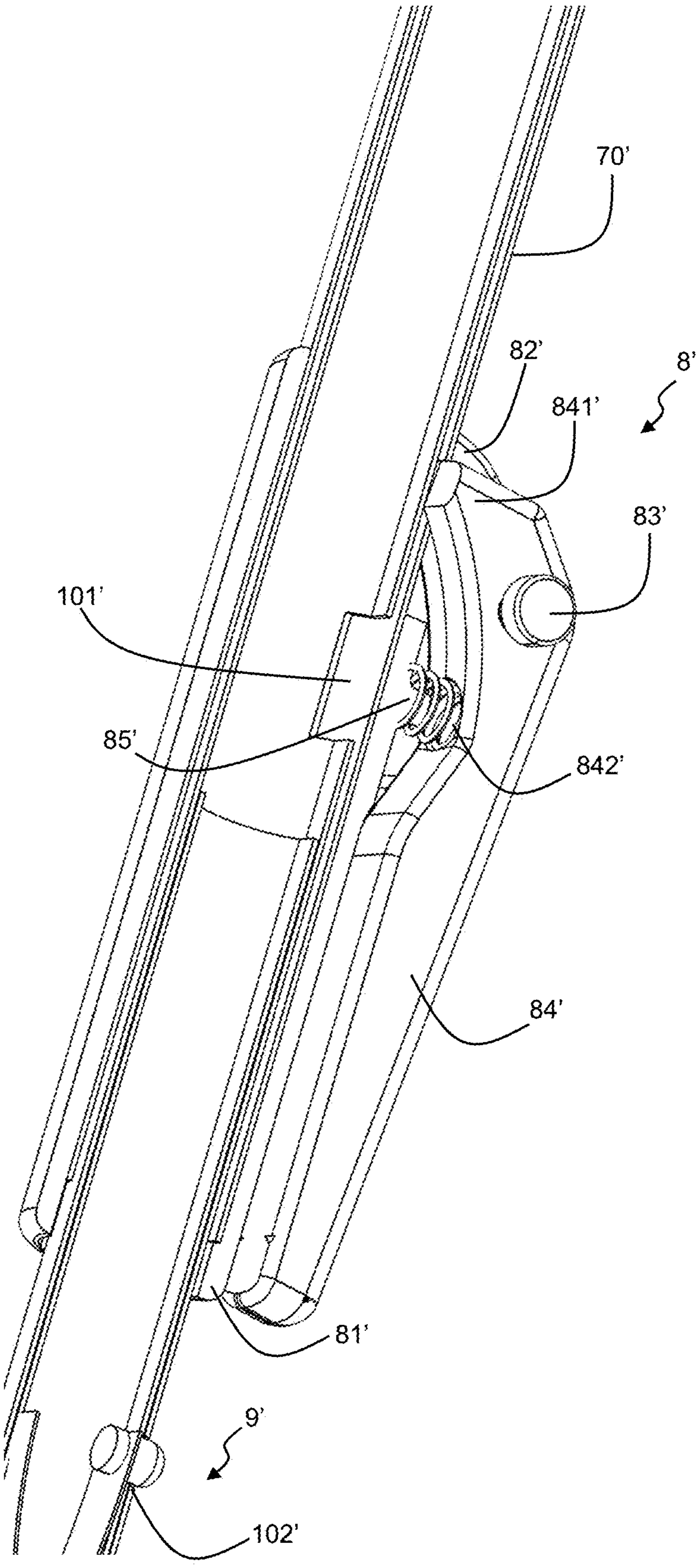
FIG. 8 shows another view of the safety mechanism of the extension pole of FIG. 7, wherein the extension pole is shown in sectional view.
Figure 9:
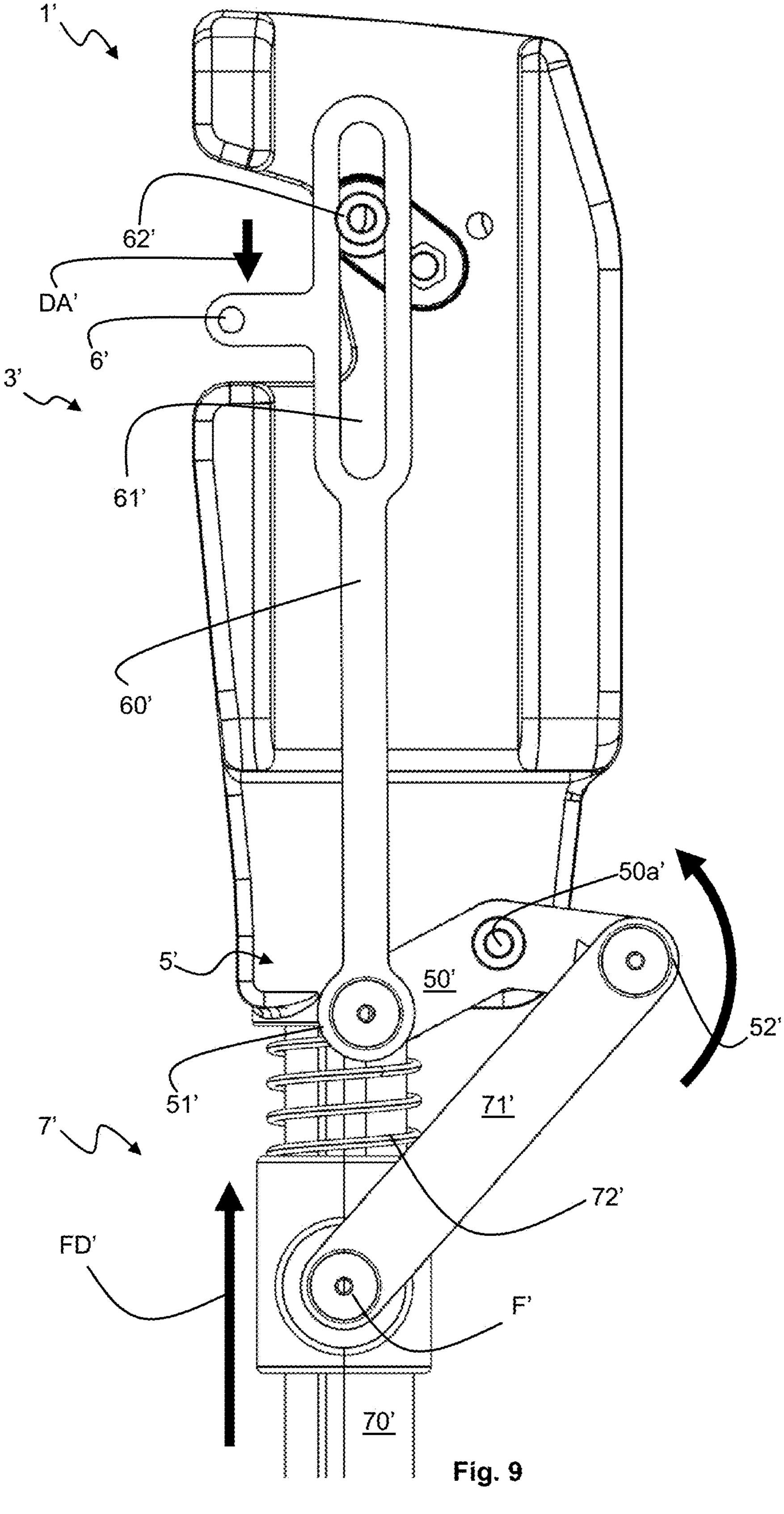
FIG. 9 shows a housing of the extension pole of FIG. 7.
Figure 10:
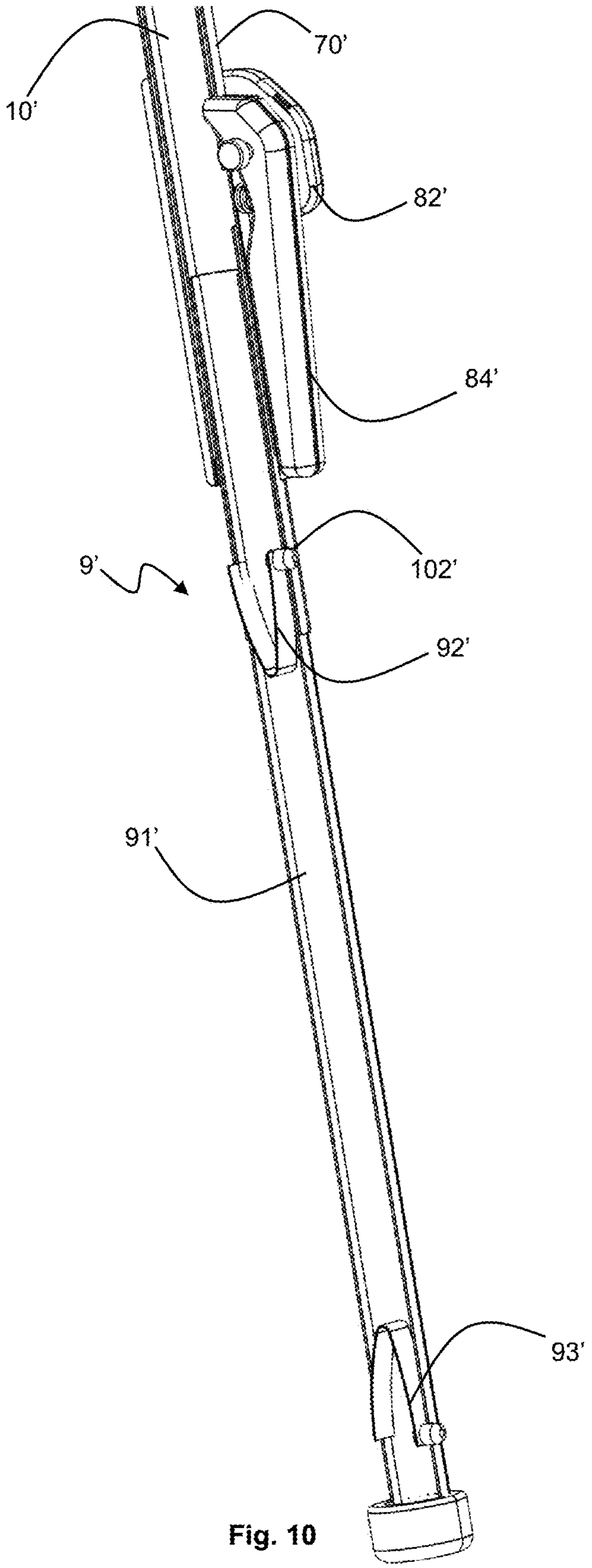
FIG. 10 shows a length adjustment mechanism of the extension pole of FIG. 7, wherein the extension pole is shown in sectional view.

Referring now to FIGS. 7 to 10 there is shown an extension pole 1' according to another example embodiment of the present disclosure. The extension pole 1' of this example embodiment is similar to the extension pole 1 of the previous example embodiment, and similar features are denoted with the same reference numerals with a succeeding prime ('). A section view of the extension pole 1' is shown in FIGS. 7, 8 and 10.

The extension pole 1' of this example embodiment differs from the extension pole 1 of the previous example embodiment in that this extension pole 1' comprises a safety mechanism 8'. The safety mechanism 8' is mounted to the tubular handle 70' of the release 7'. The safety mechanism 8' is shown in FIGS. 7 and 8.

The safety mechanism 8' has a sleeve 81' that radially abuts the tubular handle 70', for example with an interference fit. The sleeve 81' can instead be glued to the tubular handle 70', or fastened to the tubular handle 70' by other mechanism, such as fasteners. The sleeve 81' has an internal shoulder at one end, which abuts and end of the tubular handle 70'. When the sleeve 81' is pushed towards the housing-like mounting mechanism, which is referred to as the housing 3' hereafter, the internal shoulder of the sleeve 81' pushes the tubular handle 70' towards the housing 3'.

The safety mechanism 8' has a pivot plate 82' extending away from the sleeve 81' in a radial direction. A pivot pin 83' is connected to and protrudes from a major surface of the pivot plate 82', parallel to a radial direction of the sleeve 81'. The pivot pin 83' has a shaft portion, which adjoins the pivot plate 82', and an enlarged head at the end of the shaft portion opposite to the pivot plate 82'.

The safety mechanism 8' has a lever handle 84'. The lever handle 84' has a laterally extending hole proximal an end thereof. The pivot pin 84' is received through the hole. The shaft of the pivot pin 83' is received through the hole of the lever handle 84' such that the lever handle 84' is captive between the enlarge head of the pivot pin 83' and the pivot plate 82'. The lever handle 84' has a safety stop 841' at an end that the hole is closest to. The sleeve 81' has a radial aperture at a location corresponding to the safety stop 841' of the lever handle 84'. When the lever handle 84' is pivoted about the pivot pin 83', the safety stop 841' is moved through the aperture in the sleeve, as is described in more detail subsequently. The lever handle 84' has an engagement aperture 842' located in a surface that faces the sleeve 81'.

The safety mechanism 8' has an engagement pin 85' extending radially from the sleeve 81'. The engagement pin 85' is receivable in the engagement aperture 842' of the lever handle 84' when the lever handle 84' is rotated about the pivot pin 83'. The safety mechanism 8' has a spring 86' surrounding the engagement pin 85'. The spring 86' is axially captive between a radially outer surface of the sleeve 81' and the surface of the lever handle 84' that faces the sleeve 81'. The spring 86' is axially compressed in this captive position, and thus applies a force to the lever handle 84' in a direction away from the sleeve 81'.

In this example embodiment, the rod 10' is tubular and differs from the rod 10 of the previous example embodiment in that there is a locking aperture 101' through a sidewall thereof. The locking aperture 101' is located such that the safety stop 841' of the lever handle 84' can pass through the locking aperture 101'. The rod 10' of this example embodiment also differs from the rod 10 of the previous example embodiment in that there is a length adjustment hole 102'. The functionality if the length adjustment hole 102' is described in more depth, subsequently.

The lever handle 84' is preferably made from moulded plastic. The sleeve 81' and pivot plate 82' are preferably made from moulded plastic and are preferably unitary. The pivot pin 83' is preferably metallic. The pivot pin 83' is preferably inserted through the hole in the lever handle 84' and connected to the pivot plate 82'. For example, the pivot pin 83' can pass through a hole in the pivot plate 83' and have a connecter on the other side. Alternatively, the pivot pin 83' can be a rivet or can connect directly to a thread on the pivot plate 82'. It would be understood that numerous formulations of the pivot pin 83' are envisaged.

The operation of the safety mechanism 8' is now described.

When the tubular handle 70' is in a locked position (not shown), the spring 86' urges the handle 84' to rotate about the pivot pin 83' such that the safety stop 841' passes through the radial aperture of the sleeve 81' as well as through the locking aperture 101' in the rod 10'. The presence of the safety stop 841' in the locking aperture 101' of the rod 10' prevents axial movement of the sleeve 81' and so also prevents axial movement of the handle 70', relative to the rod 10'. Therefore, activation of the trigger 22 of the driving tool 2 is prevented. In the locked position the engagement pin 85' is either disengaged from, or not fully engaged with, the engagement aperture 842'.

In order to activate the trigger 22 of the driving tool 2, the lever handle 84' is pushed by a user such that it rotates about the pivot pin 83'. The force applied by the user overcomes the axial force applied by the spring 86'. The engagement pin 85' engages, or further engages, the engagement hole 842' and the safety stop 841' leaves the locking aperture 101' of the rod 10'. Therefore, the handle 70' is slidable over the rod 10' to activate the trigger 22 of the driving tool 2 in the same way as described in the previous example embodiment of extension pole 1. That is, the user pushes the sleeve 81' and handle 70' towards the housing 3', overcoming the axial force applied by the spring 72' of the release 7', such that the trigger actuator 6' actuates the trigger 22 of the driving tool 2, as described with reference to the previous example embodiment.

During sliding of the handle 70' over the rod 10' to activate the trigger 22, the spring 86' of the safety mechanism 8' urges the safety stop 841' towards the rod 10', and so the safety stop 841' slides over a radially outer surface of the rod 10'. That is, unless the user maintains a force on the lever handle 84' to keep the safety stop 841' away from the outer surface of the rod 10'.

The spring 72' of the release 7' maintains a force to urge the handle 70' away from the housing 3' so that, when a user has finished activating the trigger 22 of the driving tool 2, they can allow the handle 70' to slide away from the housing 3' due to the force of the spring 72', until the safety stop 841' of the lever handle 84' of the safety mechanism 8' re-enters the locking aperture 101' in the rod 10'.

The trigger 22 of the driving tool 2 is therefore prevented from being activated unless the lever handle 84' is pressed, and so this prevents accidental activation of the trigger 22 of the driving tool 2. This mechanism that the safety stop 34 on the housing, as described in the previous embodiment, is not required.

It will be appreciated that the safety mechanism 8' of this extension pole 1' can be incorporated into the extension pole 1 of the previous example embodiment.

Referring now to FIG. 9, there is shown the housing 3', actuating mechanism 5', trigger actuator 6' and release 7' of the extension pole 1' of this example embodiment. These are similar to those of the extension pole 1 of the previous example embodiment, and only differences are discussed herein.

The release 7' comprises a connection plate 71' that is straight instead of being L-shaped as in the previous example embodiment. The connection plate 71' is fixed to the tubular handle 70' by a single fastener F' about which the connection plate 71' is pivotable. The connection plate 71' is pivotably connected to a second end 52' of a lever 50'. A first end 51' of the lever 50' is pivotably connected to a trigger actuator 6'. The lever 50' is also connected to the housing 3' between its ends 51' and 52' by a further pivotable connection **50*a*'. The lever 50' of this example embodiment has first section having the first end 51', a second section having the second end 52', where the first and second sections are joined at an elbow with an obtuse angle. The pivotable connection 50*a*'** is located at the elbow.

The trigger actuator 6' is pivotably connected to the first end 51' of the lever 50' by an actuator plate 60'. One end of the actuator plate 60' is pivotably connected to the lever 50' and the trigger actuator 6' is mounted to the actuator plate 60' adjacent its opposite end. The actuator plate 60' comprises a slot 61' along a part of its length, which receives a pin 62' fixed to the housing 3' to allow longitudinal movement of the actuator plate 60'. This is different to the previous example embodiment because there is only one pin 62' in this example embodiment, where there are two pins 62 in the previous example embodiment.

As in the previous example embodiment, a release force FD' applied to the tubular handle 70' of the release 7' causes it to slide along the rod 10' towards the housing 3' from a retracted position to an extended position. As a result, the trigger actuator 6' moves in the opposite direction to actuate the trigger 22 of the driving tool 2.

As explained previously, the tubular handle 70' is biased towards the retracted position and returns to this position when it is released.

The differences between this example embodiment and the previous example embodiment make the trigger actuator 6' and release 7' less complex, as the joints are simple pivotable connectors. This simpler configuration is made possible, at least in part, due to the safety mechanism 8' meaning that a safety stop in the housing 3, such as the safety stop 34 in the housing 3 of the previous example embodiment, to prevent the lever 50 from rotating and activating the trigger 22 accidentally, is no longer necessary.

Referring now to FIG. 9, a length adjuster 9' is shown. The length adjuster 9' has an adjustment pole 91' slidably receivable inside of the tubular rod 10'. The length adjuster 9' has a first spring button 92' and a second spring button 93', each spring button 92', 93' located inside of the adjustment pole 91'. The first spring button 91' is located about one quarter of the distance along the length adjustment pole 91' from a first end of the adjustment pole 91'. The second spring button 93' is located proximal a second end of the adjustment pole 91'. Each spring button 92', 93' has a folded metal spring mechanism and a button attached to an end thereof. Each button passes through a respective hole in the adjustment pole 91'. The length adjuster 9' has an enlarged portion 94' at or attached to the second end of the adjustment pole 91'. The enlarged portion has a greater diameter than the rest of the adjustment pole 91'.

In use, the adjustment pole 91' is adjustable between an extended position, as shown in FIG. 9, and a retracted position (not shown). In the extended position, a majority of the adjustment pole 91' is outside of the rod 10' and the first spring button 92' passes through the length adjustment hole 102' in the rod 10', thereby securing the adjustment pole 91' in the extended position. In the extended position the second spring button 93' is located outside of the rod 10'.

In the retracted position, the second spring button 93' extends through the length adjustment hole 102' in the rod 10', thereby securing the adjustment pole 91' in the retracted position. In the retracted position the first spring button 92' is located inside of the rod 10' and the spring mechanism urges the button against an inside surface of the rod 10'.

In order to extend the adjustment pole 91', that is to move the adjustment pole 91' from the retracted position to the extended position, the second spring button 92' is pushed radially inwardly and the adjustment pole 91' is pulled out of the rod 10, for example by a user gripping the enlarged end 94'. The button of the first spring button 92' slides along the inside surface of the rod 10' until it reaches the length adjustment hole 102' of the rod 10', and the spring mechanism urges the button to pass through the length adjustment hole 102'.

To retract the adjustment pole 91' again, the button of the first spring button 92' is pushed radially inwardly and the adjustment pole 91' is pushed into the rod 10'. The button of the first spring button slides along the inside surface of the rod 10'. When the button of the second spring button 93' approaches an end of the rod 10', the user pushes this radially inwardly such that the button can enter the rod 10'. When the button of the second spring button 93' reaches the length adjustment hole 102' of the rod 10' the spring mechanism urges the button to pass through the length adjustment hole 102' to secure the adjustment pole 91' in the retracted position.

Throughout the description, the words “comprise” and “contain,” and variations thereof mean “including but not limited to”, and are not intended to (and do not exclude) other whole or partial parts, additives, or components. Throughout the description, the singular includes the plural, unless the context otherwise requires. In particular, where the indefinite article is used, the specification should be understood to contemplate plurality as well as singularity, unless the context otherwise requires.

Features, integers, characteristics, compounds, or groups described in connection with a particular aspect, embodiment or example of the disclosure are to be understood as applicable to any other aspect, embodiment or example described herein, unless inconsistent therewith.

The invention claimed is:

1. An extension pole for a driving tool, the extension pole comprising:

a rod have a first end and a second end;

a mounting mechanism at the first end of the rod and connectable to the driving tool, the mounting mechanism including:

a housing with a handle seat configured to receive a handle of the driving tool, and a securing mechanism including a latch operable to engage the handle under the trigger of the driving tool to secure the handle to the handle seat; and an actuating mechanism connected to the mounting mechanism and configured such that a release force applied towards the driving tool when the driving tool is connected to the mounting mechanism causes a trigger of the driving tool to move in an opposite direction to actuate the trigger.

2. The extension pole of claim 1, wherein the mounting mechanism includes a housing at the first end of the rod, and which includes a trigger actuator and a release connected to the trigger actuator by the actuating mechanism.

3. The extension pole of claim 2, wherein the actuating mechanism is configured such that a triggering force applied to the release to move the release towards the housing causes the trigger actuator to move in an opposite direction to actuate the trigger of the driving tool when the driving tool is connected to the mounting mechanism.

4. The extension pole of claim 3, wherein the actuating mechanism is configured such that a triggering force applied to the release to move the release towards the housing causes the trigger actuator to move in an opposite direction to actuate the trigger of the driving tool when the driving tool is connected to the mounting mechanism.

5. The extension pole of claim 4, wherein the actuating mechanism includes a lever with a first end connected to the trigger actuator and a second end connected to the release, the lever being pivotably connected between its first and second ends to the rod.

6. The extension pole of claim 4, wherein the release includes a tubular handle surrounding the rod and slidable there along when the release force is applied thereto.

7. The extension pole of claim 6, wherein the tubular handle is biased towards a retracted position and is movable from the retracted position to an extended position when the release force is applied thereto.

8. The extension pole of claim 6, wherein the release includes a connection plate pivotably connected at a first end to the tubular handle and pivotably connected at a second end to the second end of the lever.

9. The extension pole of claim 8, wherein the connection plate is L-shaped, is fixed to the tubular handle by two fasteners and is pivotably connected to the second end of the lever.

10. The extension pole of claim 4, which includes a pin fixed to the housing, wherein the trigger actuator defines a slot, the pin receivable in the slot such that the trigger actuator is movable along the at least one pin.

11. The extension pole of claim 10, wherein the pin is one of two pins receivable in the slot such that the trigger actuator is movable along the two pins.

12. The extension pole of claim 1, which includes a safety stop configured to inhibit unintentional actuation of the trigger of the driving tool.

13. The extension pole of claim 12, wherein the release includes a tubular handle surrounding the rod and slidable there along when the release force is applied thereto, and wherein unintentional actuation of the trigger is inhibited by the safety stop passing through aligned apertures in the tubular handle and the rod.

14. The extension pole of claim 13, wherein the safety stop is at an end of a lever handle, the lever handle pivotable against a force applied by a biasing member, to retract the safety stop from the aperture in the rod to allow the tubular handle to slide along the rod.

15. The extension pole of claim 1, wherein the mounting mechanism includes a magazine holder seat configured to receive a magazine holder of the driving tool, and wherein the securing mechanism is configured to fasten the magazine holder in the magazine holder seat.

16. The extension pole of claim 15, wherein the latch is operable to secure the magazine holder in the magazine holder seat.

17. The extension pole of claim 1, which includes a length adjustment pole movable between an extended position and a retracted position.

18. An extension pole for a driving tool, the extension pole comprising:

a rod have a first end and a second end;

a mounting mechanism at the first end of the rod and connectable to the driving tool, the mounting mechanism including:

a magazine holder seat configured to receive a magazine holder of the driving tool, and a securing mechanism including a latch operable to engage the handle under the trigger of the driving tool to secure the magazine holder to the magazine holder seat; and an actuating mechanism connected to the mounting mechanism and configured such that a release force applied towards the driving tool when the driving tool is connected to the mounting mechanism causes a trigger of the driving tool to move in an opposite direction to actuate the trigger.

19. An extension pole for a driving tool, the extension pole comprising:

a rod have a first end and a second end;

a mounting mechanism at the first end of the rod and connectable to the driving tool, the mounting mechanism including a housing at the first end of the rod;

an actuating mechanism connected to the mounting mechanism;

a trigger actuator; and a release connected to the trigger actuator by the actuating mechanism, the release including a tubular handle surrounding the rod and slidable there along when a release force is applied to the tubular handle, and wherein the actuating mechanism is configured such that a triggering force applied to the release to move the tubular handle towards the housing causes the trigger actuator to move in an opposite direction to actuate the trigger of the driving tool when the driving tool is connected to the mounting mechanism.

* * * * *